US007121978B2

United States Patent
Murakami et al.

(10) Patent No.: US 7,121,978 B2
(45) Date of Patent: Oct. 17, 2006

(54) SHIFT SHOCK SYSTEM OF AUTOMATIC TRANSMISSION

(75) Inventors: Kenichiro Murakami, Kanagawa (JP); Hiroyuki Takenaka, Shizuoka (JP); Osamu Sato, Kanagawa (JP)

(73) Assignees: Nissan Motor Co., Ltd., Yokohama (JP); JATCO Ltd, Fuji (JP)

( * ) Notice: Subject to any disclaimer, the term of this patent is extended or adjusted under 35 U.S.C. 154(b) by 234 days.

(21) Appl. No.: 10/930,854

(22) Filed: Sep. 1, 2004

(65) Prior Publication Data

US 2005/0049112 A1   Mar. 3, 2005

(30) Foreign Application Priority Data

Sep. 3, 2003   (JP) ............................. 2003-311145

(51) Int. Cl.
  *B60W 10/04*   (2006.01)
(52) U.S. Cl. .................................................... 477/109
(58) Field of Classification Search ................ 477/107, 477/109, 110; 701/57, 58, 60, 61, 64
  See application file for complete search history.

(56) References Cited

U.S. PATENT DOCUMENTS 5,562,567 A * 10/1996 Koenig et al. ................ 477/54
5,790,968 A * 8/1998 Kashiwabara et al. ........ 701/51
6,023,647 A * 2/2000 Saito et al. .................... 701/57
6,991,584 B1 * 1/2006 Cowan ......................... 477/110
7,048,671 B1 * 5/2006 Morisawa et al. ........... 477/109
2003/0100401 A1 * 5/2003 Kim ............................ 477/107

FOREIGN PATENT DOCUMENTS

JP   61-135831 A   6/1986

* cited by examiner

*Primary Examiner*—Roger Pang
(74) *Attorney, Agent, or Firm*—Foley & Lardner LLP

(57) ABSTRACT

A shift shock reduction system comprises a first section that causes an engine to produce a normal engine torque in accordance with an existing operation condition of a vehicle; a second section that changes an output rotation of the engine to an output rotation of an automatic transmission in accordance with an existing gear ratio derived from a rate between a rotation speed of an input member of the transmission and that of an output member of the same; a third section that corrects the engine torque upon sensing start of a shift shock reduction operation; a fourth section that detects completion of the correction of the engine torque; and a fifth section that returns the corrected engine torque to the normal engine torque upon sensing the completion of the engine torque correction. The fourth section detects the completion of the engine torque correction by making reference to a change rate per time of the existing gear ratio.

12 Claims, 3 Drawing Sheets

SHIFT SHOCK SYSTEM OF AUTOMATIC TRANSMISSION

BACKGROUND OF THE INVENTION

1. Field of the Invention

The present invention relates in general to shift shock reduction systems of an automatic transmission, and more particularly to the shift shock reduction systems of a type that reduces a shift shock of the automatic transmission by correcting an engine torque.

2. Description of the Related Art

Hitherto, various shift shock reduction systems have been proposed and put into practical use in automotive automatic transmissions. One of them is disclosed in Japanese Published Patent Application (Tokkaisho) 61-135831 (or Examined patent application publication (Tokkohei) 5-005688). In the shift shock reduction system of this published application, an engine torque is reduced during a gear change.

SUMMARY OF THE INVENTION

As is known, for achieving a satisfied shock reduction, the engine torque correction (or reduction) should be timely carried out in the gear change period. If not, operation performance of the engine is seriously affected by useless engine torque correction and/or the satisfied shift shock reduction is not achieved.

For obtaining such timely torque correction, the above-mentioned publication proposes a measure wherein an existing gear ratio derived from a rate between output rotation speed of the transmission and input rotation speed of the same is monitored, and when the existing gear ratio starts to change from a before-shift gear ratio toward an after-shift gear ratio, reduction of the engine torque is started, and when the existing gear ratio comes to a predetermined gear ratio, the engine torque is gradually returned or increased to a normal value that meets the existing condition of an associated motor vehicle. That is, once the existing gear ratio comes to the predetermined gear ratio, a so-called torque return control is started.

However, it has been revealed that the measure of the above-mentioned publication fails to sufficiently deal with an inevitable dispersion of engaging power of friction elements such as the engaging power dispersion of clutches and brakes of the transmission. Actually, due to presence of such dispersion, the engine torque correction used for adequately reducing the shift shock is subjected to a not-small dispersion, which of course affects the shift shock reduction performance of the system.

That is, due to presence of such dispersion in the engine torque correction, the torque return control has to be started somewhat earlier than at the time when the existing gear ratio comes to the predetermined gear ratio. However, in this earlier starting of the torque return control, it tends to occur that the existing engine torque is returned to the normal value somewhat earlier than a target time. In this case, the shift shock reduction is not satisfactorily carried out.

Accordingly, the present invention aims to provide an improved shift shock reduction system of an automatic transmission, which is free of the above-mentioned shortcoming.

In accordance with the present invention, there is provided a shift shock reduction system of an automatic transmission, in which the start timing of the torque return control is determined in accordance with a change rate (viz., rate of change per time) of the existing gear ratio.

In accordance with a first aspect of the present invention, there is provided a shift shock reduction system for use in a motor vehicle powered by an internal combustion engine through an automatic transmission. The shift shock reduction system comprises a first section that causes the engine to produce a normal engine torque in accordance with an existing operation condition of the vehicle; a second section that changes an output rotation of the engine to an output rotation of the transmission in accordance with an existing gear ratio that is derived from a rate between a rotation speed of an input member of the transmission and a rotation speed of an output member of the same; a third section that corrects the engine torque upon sensing start of a shift shock reduction operation; a fourth section that detects completion of the correction of the engine torque; and a fifth section that returns the corrected engine torque to the normal engine torque when the fourth section detects the completion of the correction of the engine torque, wherein the fourth section detects the completion of the engine torque correction by making reference to a change rate per time of the existing gear ratio.

In accordance with a second aspect of the present invention, there is provided a shift shock reduction system of an automotive automatic transmission, which comprises an engine speed sensor that senses an engine speed; a throttle open degree sensor that senses a throttle open degree of a throttle valve of the engine; an input rotation sensor that senses a rotation speed of an input member of the transmission; an output rotation sensor that senses a rotation speed of an output member of the transmission; and a control unit that is configured to carry out detecting an existing engine torque; deriving, based on the engine speed and the throttle open degree, a target engine torque that is suitable for an existing operation condition of the vehicle; carrying out, based on the engine speed, the throttle open degree, the existing engine torque and the target engine torque, a torque reduction control that is programmed to reduce the existing engine torque upon sensing starting of a shift shock reduction operation and a torque return control that is programmed to raise the reduced existing engine torque to a value of the target engine torque upon sensing a completion of the torque reduction control; and detecting the completion of the torque reduction control by making reference to a change rate per time of an existing gear ratio derived from a rate between the transmission input member rotation speed and the transmission output member rotation speed.

In accordance with a third aspect of the present invention, there is provided, in a motor vehicle powered by an internal combustion engine through an automatic transmission, a method for reducing a shock produced when the transmission carries out a speed change. The method comprises causing the engine to produce a normal engine torque in accordance with an existing operation condition; changing an output rotation of the engine to an output rotation of the transmission in accordance with an existing gear ratio that is derived from a rate between a rotation speed of an input member of the transmission and a rotation speed of an output member of the same; correcting the engine torque upon sensing start of a shift shock reduction operation; detecting completion of the correction of the engine torque by making a reference to a change rate per time of the existing gear ratio; and returning the corrected engine torque to the normal engine torque when the completion of the correction of the engine torque is detected.

DETAILED DESCRIPTION OF THE INVENTION

Figure 1:
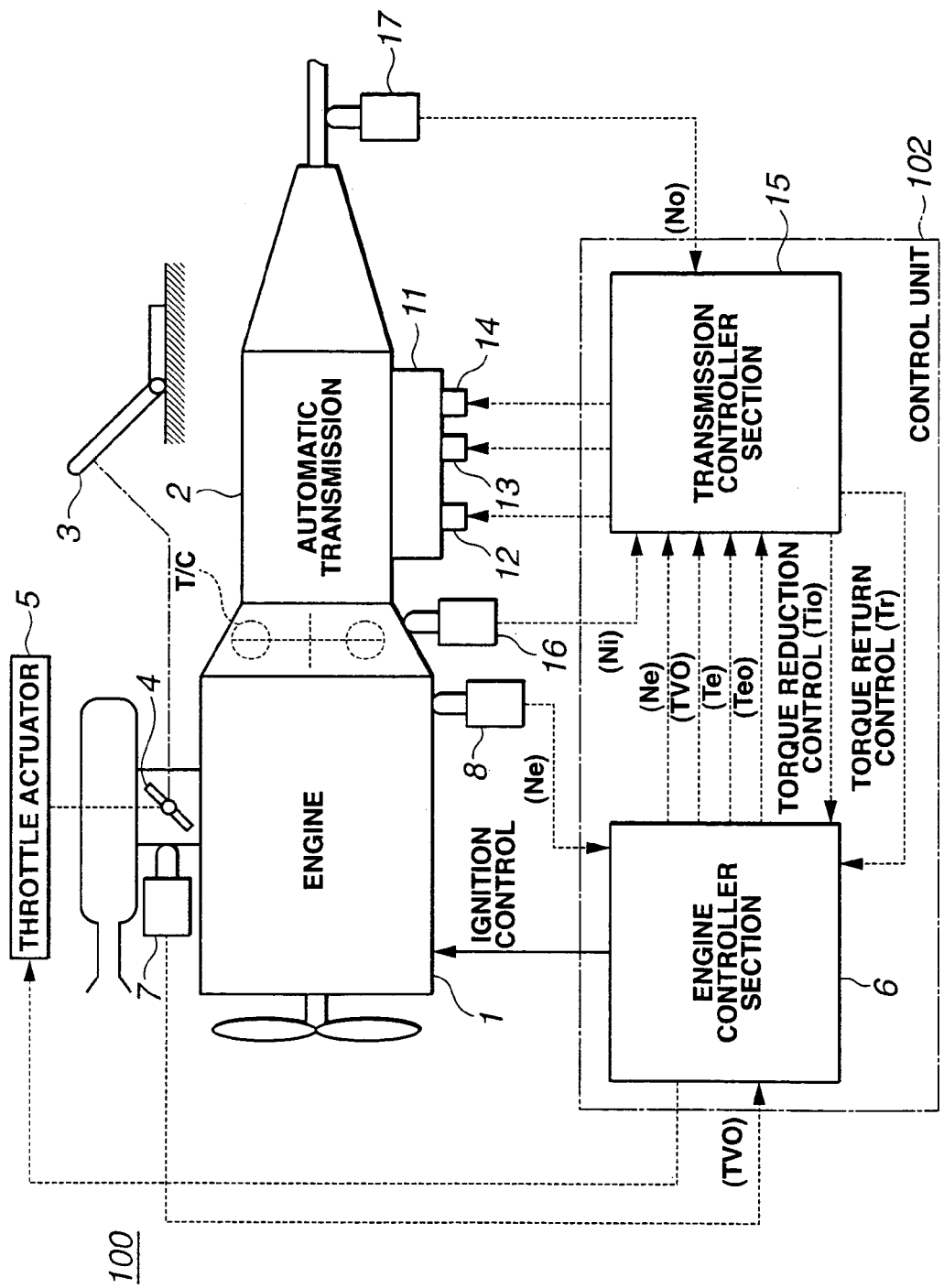
FIG. 1 is a block diagram of a shift shock reduction system according to the present invention.

Referring to FIG. 1 of the drawings, there is schematically shown a shift shock reduction system 100 of the present invention, which is practically arranged in an automotive power train unit that includes an internal combustion engine 1 and an automatic transmission 2.

A control unit 102 is employed for controlling the shift shock reduction system 100, which generally comprises an engine controller section 6 and a transmission controller section 15. Each controller section 6 or 15 has a microcomputer that generally comprises a central processing unit (CPU), a random access memory (RAM), a read only memory (ROM) and input and output interfaces. Of course, if desired, these two controller sections 6 and 15 may be provided by one micro-computer with the aid of a soft-ware field technique.

Output of engine 1 is controlled by an accelerator pedal 3 through a throttle valve 4 of engine 1. That is, upon depression of accelerator pedal 3 by a driver, throttle valve 4 is pivoted from a full-closed position toward a full-open position in accordance with a depression degree of accelerator pedal 3. The engine output is inputted to automatic transmission 2 through a torque converter T/C.

Basically, the open degree of throttle valve 4 depends on the depression degree of accelerator pedal 3. However, due to employment of a throttle actuator 5, the open degree of throttle valve 4 is controllable independent of accelerator pedal 3. As will be described in detail in the following, by suitably controlling throttle actuator 5, reduction/increase of the engine torque needed for the shift shock reduction is carried out.

Throttle actuator 5 is controlled by engine controller section 6. Besides controlling throttle actuator 5, engine controller section 6 is able to control ignition timing of engine 1 for reducing/increasing the engine torque for the shift shock reduction.

Furthermore, engine controller section 6 is able to control a fuel injection amount, a fuel injection timing and the like in accordance with an operation condition of engine 1.

For achieving the above-mentioned controls, various information signals are fed into engine controller section 6, which are a throttle open degree representing signal "TVO" issued from a throttle open degree sensor 7, an engine speed representing signal "Ne" issued from an engine speed sensor 8, an after-mentioned engine torque reduction control signal "Tio" and an after-mentioned engine torque return control signal. The engine torque reduction control signal and the engine torque return control signal are issued from transmission controller section 15 which will be described in detail hereinafter.

Usually, by processing the throttle open degree signal "TVO", the engine speed signal "Ne" and other information signals representing the existing condition of an associated motor vehicle, engine controller section 6 calculates a target or desired engine torque "Teo" appropriate for the existing operation condition of the vehicle. Based on this target engine torque "Teo", engine controller section 6 controls engine 1 by adjusting fuel injection amount, fuel injection timing, ignition timing, etc., so as to permit engine 1 to output the target engine torque "Teo".

Automatic transmission 2 generally comprises planetary gear units that constitute power transmission paths, hydraulically actuated friction elements such as clutches and brakes that vary the power transmission paths to constitute desired speeds (viz., forward speeds and a reverse speed) with the aid of hydraulic power and a control valve 11 that controls ON/OFF operation of the friction elements with the aid of hydraulic duty solenoids 12, 13 and 14. These duty solenoids 12, 13 and 14 function to control the hydraulic pressure directed to corresponding friction elements in a duty cycle manner. That is, by selectively operating the friction elements with the aid of solenoids 12, 13 and 14, transmission 2 can assume one of the forward and reverse speeds.

Thus, under running of the vehicle, the engine power led into transmission 2 is subjected to a speed change in accordance with a speed selected by transmission 2 before being outputted to a differential gear (not shown).

As shown, hydraulic duty solenoids 12, 13 and 14 are controlled by transmission controller section 15. More specifically, duty ratio of each solenoid 12, 13 or 14 is controlled by transmission controller section 15.

Into transmission controller section 15, there are inputted various information signals which are the engine speed representing signal "NE", the throttle open degree representing signal "TVO" (these "NE" and "TVO" are inputted through engine controller section 6 as shown), an existing engine torque "Te" derived by engine controller section 6, the above-mentioned target engine torque "Teo" calculated by engine controller section 6, a transmission input rotation speed representing signal "Ni" issued from an input rotation sensor 16 that detects the speed of an input shaft of transmission 2, and a transmission output rotation speed representing signal "No" issued from an output rotation sensor 17 that detects the speed an output shaft of transmission 2.

In transmission controller section 15, the following speed change control is carried out in accordance with a known control program by processing the above-mentioned information signals.

First, with reference to a predetermined speed change pattern map (not shown) that shows a relation between throttle open degree "TVO" and a vehicle speed "VSP" derived from transmission output rotation speed "No", a desired speed for the exhibiting operation condition of the vehicle is derived or looked up. If the desired speed thus derived shows an agreement with the existing speed of transmission 2, speed change instruction is not issued. In this case, the duty ratio of duty solenoids 12, 13 and 14 is kept unchanged. However, if the desired speed derived does not show an agreement with the existing speed of transmission 2, speed change instruction is issued to change the duty ratio of duty solenoids 12, 13 and 14. With this, speed change from the existing speed to the desired speed is actually carried out in transmission 2 with the aid of the friction elements. However, as is known, under this speed change, a shift shock tends to be produced which makes the driver and passengers uncomfortable.

In the following, a shift shock reduction control of the present invention for reducing such shift shock will be described in detail with reference to FIGS. 2 and 3.

As will become apparent as the description proceeds, the shift shock reduction control of the invention comprises generally an engine torque reduction control and an engine torque return control.

Figure 2:
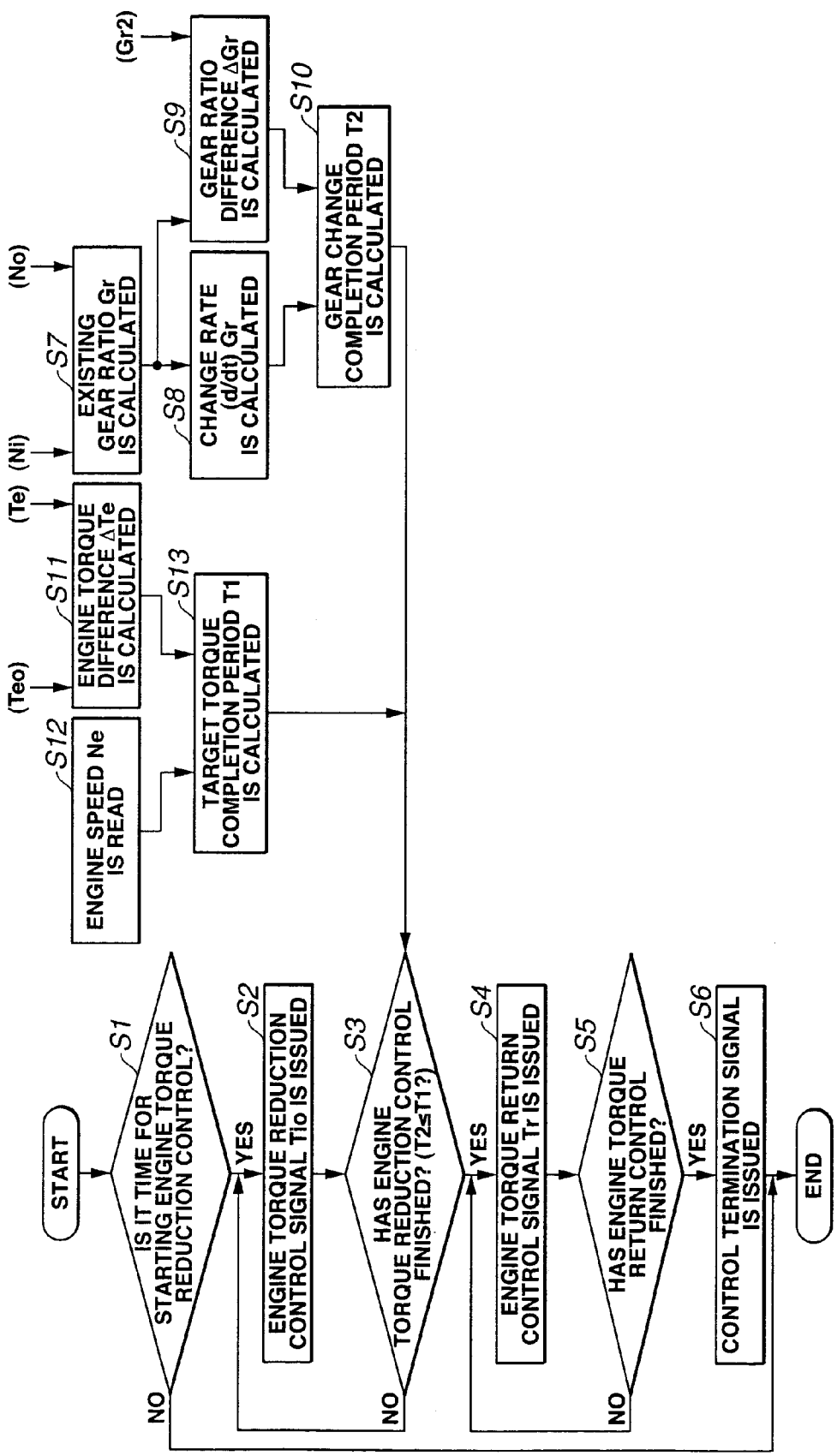
FIG. 2 is a flowchart showing programmed operation steps that are executed by a control unit employed in the shift shock reduction system of the present invention.

In FIG. 2, there is shown a flowchart that depicts programmed operation steps executed by control unit 102 that includes engine controller section 6 and transmission controller section 15.

In the flowchart of FIG. 2, at step S1, judgment is carried out in transmission controller section 15 as to whether an engine torque reduction control should be started or not. If YES, that is, when, as is seen from FIG. 3, it is the time "t1" when an existing gear ratio "Gr" (=Ni/No) derived from a rate between existing output rotation speed of transmission 2 and existing input rotation speed of the same has started to change from a before-shift gear ratio "Gr1" toward an after-shift gear ratio "Gr2", the operation flow goes to step S2. While, if NO, the operation flow goes to END.

At step S2, an engine torque reduction control signal "Tio" is issued from transmission controller section 15 to engine controller section 6 as is seen from FIG. 1.

Figure 3:
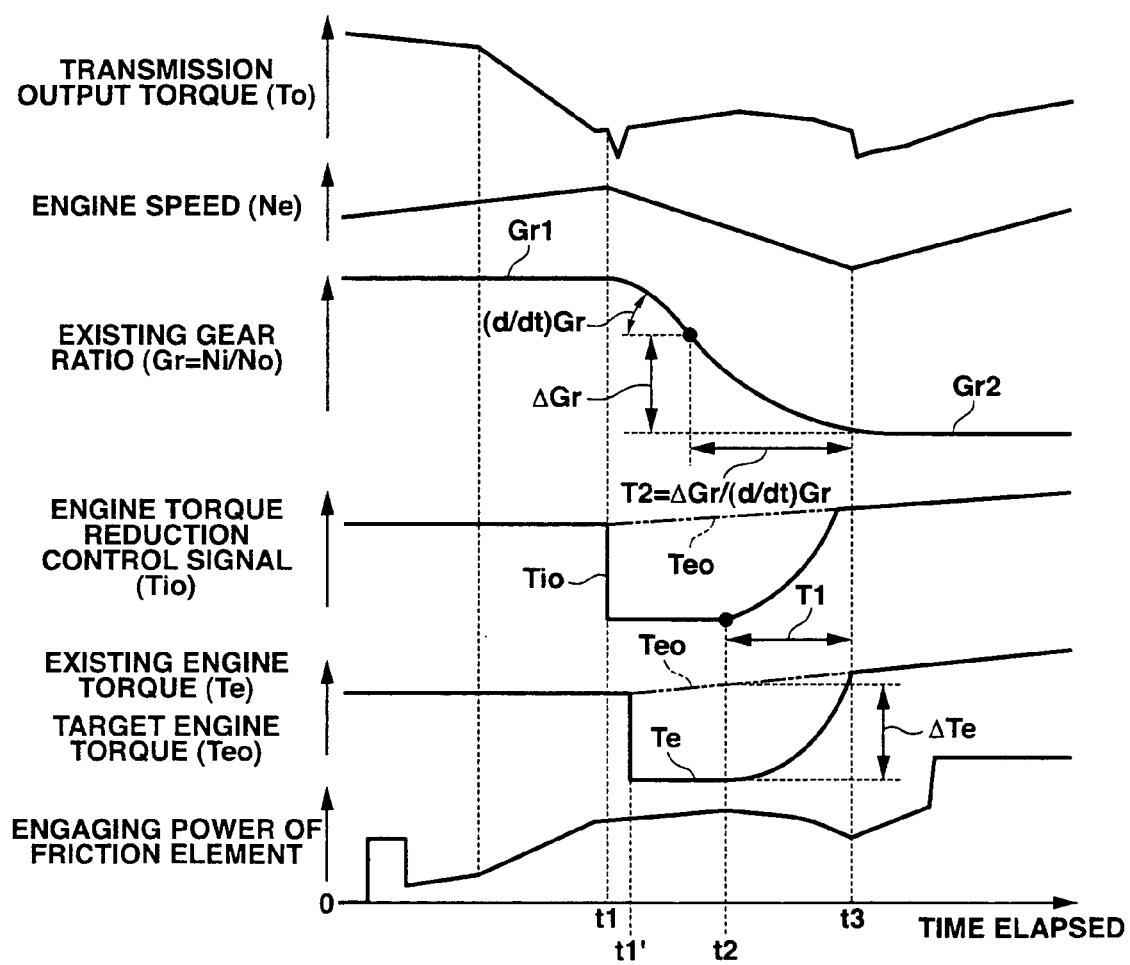
FIG. 3 is a time chart that depicts a shift shock reduction control executed by the shift shock reduction system of the present invention.

As is seen from the time chart of FIG. 3, the engine torque reduction control signal "Tio" is designed to instantly drop, at the time "t1", an engine torque that is to be inputted to transmission 2.

Upon receiving engine torque reduction control signal "Tio", engine controller section 6 controls throttle actuator 4 to reduce the open degree of throttle valve 4, and thus the existing engine torque "Te" is dropped as is seen from FIG. 3.

However, as is seen from this drawing, actually, the drop of the existing engine torque "Te" takes place at a time "t1'" that is somewhat retarded as compared with the time "t1".

Referring back to the flowchart of FIG. 2, at step S3, judgment is carried out as to whether it is the time "t2" when the engine torque reduction control has finished or not.

This judgment is carried out based on the following steps.

At step S7, an existing gear ratio "Gr" (=Ni/No) of transmission 2 is derived from a rate between output rotation speed "No" of transmission 2 and input rotation speed "Ni" of the same.

Then, at step S8, a change rate "(d/dt)Gr" of the existing gear ratio "Gr" is calculated. As is seen from the time chart of FIG. 3, the change rate "(d/dt)Gr" is continuously lowered with a passage of time.

At step S9, a gear ratio difference "ΔGr" between the existing gear ratio "Gr" and an after-shift gear ratio "Gr2" is calculated. This gear ratio difference "ΔGr" is depicted in the time chart of FIG. 3. It is to be noted that the after-shift gear ratio "Gr2" is the gear ratio that transmission 2 assumes when the speed change is finished.

At step S10, a gear change completion period "T2" from the existing time to a gear change completion time "t3" when the gear change will be completed (that is, when the existing gear ratio "Gr" becomes equal to the after-shift gear ratio "GR2") is calculated by using the following equation:

$$T2 = \Delta Gr/(d/dt)Gr \tag{1}$$

As is seen from the equation (1), the gear change completion period "T2" becomes shorter as the change rate "(d/dt)Gr" of the existing gear ratio "Gr" increases, and thus, it is estimated that the gear change completion time "t3" comes earlier as the change rate "(d/dt)Gr" increases.

Referring back to FIG. 2, at step S11, an engine torque difference "ΔTe" between the existing engine torque "Te" and the target engine torque "Teo" is calculated, as is depicted in FIG. 3.

At step S12, the engine speed "Ne" is read.

At step S13, with reference to a data map that shows a relation between the engine speed "Ne" and the torque difference "ΔTe", a target torque completion period "T1" needed by the existing engine torque "Te" to reach the target engine torque "Teo" is calculated or looked up.

When the gear change completion period "T2" becomes equal to or smaller than the target torque completion period "T1", the step S3 answers YES judging that it is the time "t2", that is, the engine torque reduction control has finished, and then the operation flow goes to step S4. While, if NO, the operation flow goes back to step S2.

At step S4, an engine torque return control signal "Tr" is issued to engine controller section 6 as is seen from FIG. 1. Upon this, the dropped existing engine torque "Te" is gradually increased to the level of the target engine torque "Teo", as is seen from the time chart of FIG. 3.

That is, as is shown in this time chart, at the time "t2", the torque return control is started while gradually increasing the dropped existing engine torque "Te" toward the level of the target engine torque "Teo".

At step S5, judgment is carried out as to whether it is the time "t3" when the torque return control has finished or not. If YES, that is, when the existing engine torque "Te" has come to the target engine torque "Teo", the operation flow goes to step S6. While, if NO, the operation flow goes back to step S4.

At step S6, a control termination instruction is issued to cause the control unit 102 to cease the shift shock reduction control.

As is understood from the above description, in accordance with the present invention, the gear change completion period "T2" is derived by calculating "ΔGr/(d/dt)Gr" for estimation of the gear change completion time "t3". The target torque completion period "T1" is picked up from the data map that shows the relation between the engine speed "Ne" and the torque difference "ΔTe". By using these two completion periods "T2" and "T1", more specifically, by comparing these two periods "T2" and "T1", the time "t2" on which the engine torque reduction control would be finished, that is, on which the torque return control should be started, is determined.

That is, the time "t2" for starting the torque return control is determined based on the change rate "(d/dt)Gr" of the existing gear ratio "Gr".

It is to be noted that the change rate "(d/dt)Gr" of the existing gear ratio "Gr" is not so remarkably influenced by the dispersion of engaging power of the friction elements and the engine torque correction as compared with the existing gear ratio that is used in the above-mentioned known system of Japanese Published Patent Application (Tokkaisho) 61-135831. That is, in the present invention, irrespective of presence of such dispersions, that is, irrespective of the time when raising of the dropped existing engine torque "Te" for the torque return control starts, the torque return control through which the existing engine torque "Te" is gradually returned to the target engine torque "Teo" can be finished at just the time "t3", as is understood from the time chart of FIG. 3.

That is, in the present invention, there is no need of advancing (or retarding) the start timing of the torque return control like in the above-mentioned known shift shock reduction system, and thus, there is no anxiety on unmatched timing in the torque control.

Furthermore, in the present invention, the gear change completion time "t3" is estimated based on the change rate "(d/dt)Gr" of the existing gear ratio "Gr", and the start timing "t2" of the torque return control is determined by subtracting the target torque completion period "T1" from the estimated gear change completion time "t3". Thus, the existing engine torque "Te" can be returned to the target engine torque "Teo" at just the time "t3", and thus, suppression of the above-mentioned unmatched timing in the torque control during the shift shock reduction operation is assured.

Furthermore, in the present invention, the target torque completion period "T1" is determined based on the torque difference "ΔTe" between the existing engine torque "Te" and the target engine torque "Teo" under the engine torque reduction period. Thus, the target torque completion period "T1" can have a value that precisely express the period from the time on which the torque return control starts to the time on which the existing engine torque is returned to the target engine torque "Teo". Thus, suppression of the above-mentioned unmatched timing in the torque control during the shift shock reduction operation is much assuredly achieved.

As is understood from the above description, in the present invention, the target torque completion period "T1" is calculated based on the engine speed "Ne" and the torque difference "ΔTe" that is corrected by the change rate "(d/dt)Gr" of the existing gear ratio "Gr".

Since the change rate "(d/dt)Gr" of the existing gear ratio "Gr" is derived with respect to the inevitable dispersion of engaging power of friction elements and the dispersion of the engine torque correction, the target torque completion period "T1" can exhibit a desired value that is really needed for the shift shock reduction control.

The entire contents of Japanese Patent Application 2003-311145 (filed Sep. 3, 2003) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A shift shock reduction system for use in a motor vehicle powered by an internal combustion engine through an automatic transmission, comprising:
    a first section that causes the engine to produce a normal engine torque in accordance with an existing operation condition of the vehicle;
    a second section that changes an output rotation of the engine to an output rotation of the transmission in accordance with an existing gear ratio that is derived from a rate between a rotation speed of an input member of the transmission and a rotation speed of an output member of the same;
    a third section that corrects the engine torque upon sensing start of a shift shock reduction operation;
    a fourth section that detects completion of the correction of the engine torque; and
    a fifth section that returns the corrected engine torque to the normal engine torque when the fourth section detects the completion of the correction of the engine torque,
    wherein the fourth section detects the completion of the engine torque correction by making reference to a change rate per time of the existing gear ratio.

2. A shift shock reduction system as claimed in claim 1, further comprising a sixth section that estimates a shift shock reduction operation finish time when the shift shock reduction operation would finish with reference to the change rate per time of the existing gear ratio, and in which the fourth section detects the completion of the engine torque correction at a time that is prior to the estimated shift shock reduction operation finish time by a predetermined period.

3. A shift shock reduction system as claimed in claim 2, in which the sixth section estimates that the shift shock reduction operation finish time comes earlier as the change rate per time of the existing gear ratio is increased.

4. A shift shock reduction system as claimed in claim 2, in which the predetermined period is derived based on an engine torque difference between the corrected engine torque and the normal engine torque.

5. A shift shock reduction system as claimed in claim 4, in which the predetermined period is derived based on the change rate per time of the existing gear ratio.

6. A shift shock reduction system as claimed in claim 5, in which the predetermined period becomes longer as the change rate per time of the existing gear ratio is increased.

7. A shift shock reduction system as claimed in claim 2, in which the predetermined period is timed with the estimated shift shock reduction operation finish time, so that the corrected engine torque is timely returned to the normal engine torque.

8. A shift shock reduction system of an automotive automatic transmission, comprising:
    an engine speed sensor that senses an engine speed;
    a throttle open degree sensor that senses a throttle open degree of a throttle valve of the engine;
    an input rotation sensor that senses a rotation speed of an input member of the transmission;
    an output rotation sensor that senses a rotation speed of an output member of the transmission; and
    a control unit that is configured to carry out:
    detecting an existing engine torque;
    deriving, based on the engine speed and the throttle open degree, a target engine torque that is suitable for an existing operation condition of the vehicle;
    carrying out, based on the engine speed, the throttle open degree, the existing engine torque and the target engine torque, a torque reduction control that is programmed to reduce the existing engine torque upon sensing starting of a shift shock reduction operation and a torque return control that is programmed to raise the reduced existing engine torque to a value of the target engine torque upon sensing a completion of the torque reduction control; and
    detecting the completion of the torque reduction control by making reference to a change rate per time of an existing gear ratio derived from a rate between the transmission input member rotation speed and the transmission output member rotation speed.

9. A shift shock reduction system as claimed in claim 8, in which the control unit is configured to carry out:
    deriving a gear ratio difference between the existing gear ratio and an after-shift gear ratio;
    deriving an engine torque difference between the existing engine torque and the target engine torque;
    deriving a gear change completion period by dividing the gear ratio difference by the change rate of the existing ratio;
    deriving a target torque completion period from the engine speed and the engine torque difference; and
    detecting the completion of the torque reduction control by comparing the gear change completion period and the target torque completion period.

10. A shift shock reduction system as claimed in claim 9, in which the control unit is configured to carry out:

detecting the completion of the torque reduction control when the gear change completion period becomes equal to or smaller than the target torque completion period.

11. A shift shock reduction system as claimed in claim 8, in which the control unit is configured to further carry out:

detecting a completion of the shift shock reduction operation based on the change rate of the existing gear ratio.

12. In a motor vehicle powered by an internal combustion engine through an automatic transmission, a method for reducing a shock produced when the transmission carries out a speed change, comprising:

causing the engine to produce a normal engine torque in accordance with an existing operation condition;

changing an output rotation of the engine to an output rotation of the transmission in accordance with an existing gear ratio that is derived from a rate between a rotation speed of an input member of the transmission and a rotation speed of an output member of the same;

correcting the engine torque upon sensing start of a shift shock reduction operation;

detecting completion of the correction of the engine torque by making a reference to a change rate per time of the existing gear ratio; and returning the corrected engine torque to the normal engine torque when the completion of the correction of the engine torque is detected.

* * * * *